(12) United States Patent
Sabharwal et al.

(10) Patent No.: US 10,769,043 B2
(45) Date of Patent: Sep. 8, 2020

(54) SYSTEM AND METHOD FOR ASSISTING USER TO RESOLVE A HARDWARE ISSUE AND A SOFTWARE ISSUE

(71) Applicant: HCL TECHNOLOGIES LIMITED, Noida, Uttar Pradesh (IN)

(72) Inventors: Navin Sabharwal, Uttar Pradesh (IN); Amit Agrawal, Uttar Pradesh (IN)

(73) Assignee: HCL TECHNOLOGIES LTD., Noida, Uttar Pradesh (IN)

( * ) Notice: Subject to any disclaimer, the term of this patent is extended or adjusted under 35 U.S.C. 154(b) by 127 days.

(21) Appl. No.: 16/017,402

(22) Filed: Jun. 25, 2018

(65) Prior Publication Data

US 2019/0391892 A1    Dec. 26, 2019

(51) Int. Cl.
*G06F 11/22* (2006.01)
*G06N 3/02* (2006.01)
*G06F 40/30* (2020.01)

(52) U.S. Cl.
CPC .......... *G06F 11/2263* (2013.01); *G06F 40/30* (2020.01); *G06N 3/02* (2013.01)

(58) Field of Classification Search
CPC combination set(s) only.
See application file for complete search history.

(56) References Cited

U.S. PATENT DOCUMENTS

| | | | |
|---|---|---|---|
| 5,404,518 A | 4/1995 | Gilbertson et al. | |
| 6,014,658 A | 1/2000 | Pretz | |
| 6,742,141 B1 | 5/2004 | Miller | |
| 7,263,632 B2* | 8/2007 | Ritz | G06F 11/0709 714/25 |
| 8,010,840 B2* | 8/2011 | Chavez, Jr. | G06F 1/28 714/26 |
| 8,065,145 B2* | 11/2011 | Okamoto | G06F 16/345 704/245 |
| 8,756,301 B2* | 6/2014 | Ennis | H04L 41/00 709/223 |
| 9,075,802 B2 | 7/2015 | Davis et al. | |
| 9,098,408 B2* | 8/2015 | Mahindru | G06F 11/07 |
| 9,189,317 B1 | 11/2015 | Marimuthu | |
| 10,282,248 B1* | 5/2019 | Gudka | G06F 11/0787 |
| 10,438,212 B1* | 10/2019 | Jilani | G06Q 10/20 |
| 2004/0236843 A1 | 11/2004 | Wing et al. | |
| 2005/0120112 A1* | 6/2005 | Wing | G06Q 10/06 709/224 |
| 2009/0063387 A1 | 3/2009 | Beaty et al. | |

(Continued)

*Primary Examiner* — Amine Riad
(74) *Attorney, Agent, or Firm* — Patent Portfolio Builders PLLC

(57) ABSTRACT

The present disclosure relates to system(s) and method(s) for assisting a user to resolve a hardware issue and a software issue. The system identifies, a target cluster, associated with a new ticket received from the user, from the set of clusters. Further, the system recommends one or more runbook scripts, from a runbook repository, associated with the new ticket. The system further identifies a new runbook script, corresponding to the new ticket, from a set of external repositories. Further, the system executes at least one of the one or more runbook scripts or the new runbook script, associated with the new ticket. The system further generates a document based on the execution of the one or more runbook scripts or the new runbook script, thereby assisting the user to resolve a target issue.

23 Claims, 3 Drawing Sheets

(56) References Cited

U.S. PATENT DOCUMENTS

| | | | |
|---|---|---|---|
| 2014/0122514 A1* | 5/2014 | Bostick | G06F 17/2715 |
| | | | 707/758 |
| 2015/0074666 A1* | 3/2015 | Kunii | G06F 9/445 |
| | | | 718/100 |
| 2017/0212756 A1* | 7/2017 | Ryali | G06F 8/77 |
| 2020/0004618 A1* | 1/2020 | Thornhill | G06F 9/45512 |
| 2020/0117531 A1* | 4/2020 | Sudharsana | G06N 20/00 |

* cited by examiner

U.S. 10,769,043 B2

SYSTEM AND METHOD FOR ASSISTING USER TO RESOLVE A HARDWARE ISSUE AND A SOFTWARE ISSUE

CROSS-REFERENCE TO RELATED APPLICATIONS AND PRIORITY

The present application does not claim priority from any patent application.

TECHNICAL FIELD

The present disclosure in general relates to the field of resolving a hardware issue and a software issue. More particularly, the present invention relates to a system and method for assisting a user to resolve a hardware issue and a software issue.

BACKGROUND

Generally, issues occurred in a software applications or IT infrastructure are resolved by Subject Matter Experts (SMEs) or human engineers. The SMEs resolve the issues, by executing one or more commands, based on their knowledge and severity of issue. However, this process of resolving the issues take lot of time and require lot of human efforts. Further, some automation systems are available to reduce time required for resolving issues. The automation systems enable the SMEs to create a runbook script to resolve the issue. The runbook scripts are further stored in a repository. Once an issue is occurred, the automation systems extract the runbook script based on comparison between the issue description, associated with the issue, and a runbook script description, stored in the repository. In this case, the automation systems need to regularly update the runbook script in the repository, when there exists any mismatch between the issue description and the runbook script description. Thus, the automation systems require human intervention if existing runbook scripts information need to be updated.

SUMMARY

Before the present systems and methods for assisting a user to resolve a hardware issue and a software issue, is described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and method for assisting the user to resolve the hardware issue and the software issue. This summary is not intended to identify essential features of the claimed subject matter nor is it intended for use in determining or limiting the scope of the claimed subject matter.

In one implementation, a system for assisting a user to resolve a hardware issue and a software issue is illustrated. The system comprises a memory and a processor coupled to the memory, further the processor is configured to execute programmed instructions stored in the memory. In one embodiment, the processor may execute programmed instructions stored in the memory for categorising a set of tickets, stored in a ticket repository, to generate a set of clusters. In one aspect, each cluster, from the set of clusters, may maintain one or more tickets, from the set of tickets. Each ticket, from the set of tickets, may be associated with a ticket description. In one embodiment, the set of tickets may be categorised based on the ticket description. Further, the processor may execute programmed instructions stored in the memory for identifying a target cluster, from the set of clusters, associated with a new ticket, received from the user. In one embodiment, the target cluster may be identified based on analysing a new ticket description, associated with the new ticket, using a Convolution Neural Network based neural language model. In the embodiment, the new ticket may correspond to a target issue. Once the target cluster is identified, the processor may further execute programmed instructions stored in the memory for recommending one or more runbook scripts, associated with the new ticket. In one aspect, the one or more runbook scripts may be recommended based on analysing the new ticket description using an artificial intelligence based recommendation engine. The one or more runbook scripts may be associated with a runbook script description. Further, the processor may execute programmed instructions stored in a memory for identifying a new runbook script, associated with the new ticket, from a set of external repositories, when the one or more runbook scripts, associated with the new ticket, are not available in the runbook repository or the one or more runbook scripts fail to resolve the target issue. In one aspect, the new runbook script may be identified based on using a natural language processing and a text extraction algorithm. Further, the processor may execute programmed instructions stored in the memory for executing at least one of the one or more runbook scripts or the new runbook script. Upon execution of the one or more runbook scripts or the new runbook script, the processor may execute programmed instructions stored in the memory for generating a document, thereby assisting the user to resolve the target issue.

In another implementation, a method for assisting a user to resolve a hardware issue and a software issue is illustrated. In one embodiment, the method may comprise categorising a set of tickets, stored in a ticket repository, to generate a set of clusters. In one aspect, each cluster, from the set of clusters, may maintain one or more tickets, from the set of tickets. Each ticket, from the set of tickets, may be associated with a ticket description. In one embodiment, the set of tickets may be categorised based on the ticket description. Further, the method may comprise identifying a target cluster, from the set of clusters, associated with a new ticket, received from the user. In one embodiment, the target cluster may be identified based on analysing a new ticket description, associated with the new ticket, using a Convolution Neural Network based neural language model. In the embodiment, the new ticket may correspond to a target issue. Once the target cluster is identified, the method may comprise recommending one or more runbook scripts, associated with the new ticket. In one aspect, the one or more runbook scripts may be recommended based on analysing the new ticket description using an artificial intelligence based recommendation engine. The one or more runbook scripts may be associated with a runbook script description. Further, the method may comprise identifying a new runbook script, associated with the new ticket, from a set of external repositories, when the one or more runbook scripts, associated with the new ticket, are not available in the runbook repository or the one or more runbook scripts fail to resolve the target issue. In one aspect, the new runbook script may be identified based on using a natural language processing and a text extraction algorithm. Further, the method may comprise executing at least one of the one or more runbook scripts or the new runbook script. Upon execution of the one or more runbook scripts or the new runbook script, the method may comprise generating a document, thereby assisting the user to resolve the target issue.

In yet another implementation, a computer program product having embodied computer program for assisting a user to resolve a hardware issue and a software issue is disclosed. In one embodiment, the program may comprise a program code for categorising a set of tickets, stored in a ticket repository, to generate a set of clusters. In one aspect, each cluster, from the set of clusters, may maintain one or more tickets, from the set of tickets. Each ticket, from the set of tickets, may be associated with a ticket description. In one embodiment, the set of tickets may be categorised based on the ticket description. Further, the program may comprise a program code for identifying a target cluster, from the set of clusters, associated with a new ticket, received from the user. In one embodiment, the target cluster may be identified based on analysing a new ticket description, associated with the new ticket, using a Convolution Neural Network based neural language model. In the embodiment, the new ticket may correspond to a target issue. Once the target cluster is identified, the method may comprise recommending one or more runbook scripts, associated with the new ticket. In one aspect, the one or more runbook scripts may be recommended based on analysing the new ticket description using an artificial intelligence based recommendation engine. The one or more runbook scripts may be associated with a runbook script description. Further, the program may comprise a program code for identifying a new runbook script, associated with the new ticket, from a set of external repositories, when the one or more runbook scripts, associated with the new ticket, are not available in the runbook repository or the one or more runbook scripts fail to resolve the target issue. In one aspect, the new runbook script may be identified based on using a natural language processing and a text extraction algorithm. Further, the program may comprise a program code for executing at least one of the one or more runbook scripts or the new runbook script. Upon execution of the one or more runbook scripts or the new runbook script, the program may comprise a program code for generating a document, thereby assisting the user to resolve the target issue.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
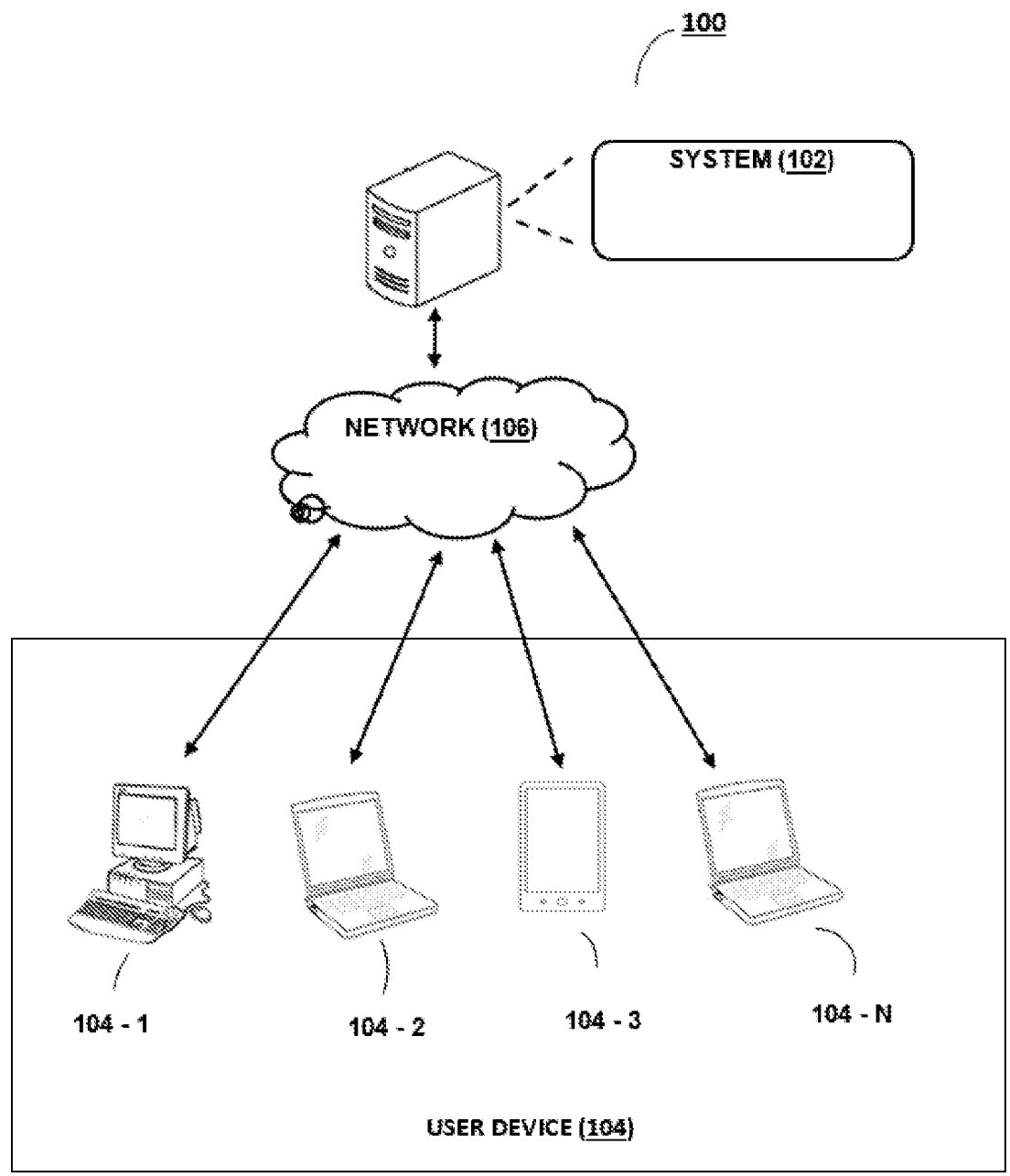
FIG. 1 illustrates a network implementation of a system for assisting a user to resolve a hardware issue and a software issue, in accordance with an embodiment of the present subject matter.

Some embodiments of the present disclosure, illustrating all its features, will now be discussed in detail. The words "categorising", "identifying", "recommending", "executing" and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an" and "the" include plural references unless the context clearly dictates otherwise. Although any systems and methods similar or equivalent to those described herein can be used in the practice or testing of embodiments of the present disclosure, the exemplary, systems and methods for assisting a user to resolve a hardware issue and a software issue are now described. The disclosed embodiments of the system and method for assisting the user to resolve the hardware issue and the software issue are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure for assisting a user to resolve a hardware issue and a software issue is not intended to be limited to the embodiments illustrated, but is to be accorded the widest scope consistent with the principles and features described herein.

The present subject matter relates to system and method for assisting a user to resolve a hardware issue and a software issue. In one embodiment, a new ticket may be received from a user. The new ticket may correspond to a target issue. The target issue may be the hardware issue or the software issue. Once the new ticket is received, a target cluster, associated with the new ticket, may be identified. The target cluster may be identified from a set of clusters. In one aspect, the target cluster may be identified based on analysing a new ticket description, associated with the new ticket, using a Convolution Neural Network based neural language model. Further, one or more runbook scripts, from a runbook repository, may be recommended based on analysing the new ticket description using an artificial intelligence based recommendation engine. If the one or more runbook scripts, associated with the new ticket, are not available in the runbook repository or the one or more runbook scripts fail to resolve the target issue, then a new runbook script may be identified from a set of external repositories. In one aspect, the new runbook script may be identified using a natural language processing and a text extraction algorithm. Further, at least one of the one or more runbook scripts or the new runbook script may be executed. Furthermore, a document may be generated based on the execution of the one or more runbook scripts or the new runbook scripts. In one aspect, the document may comprise information corresponding to the new ticket, the new ticket description, the one or more runbook scripts, the new runbook script, the target cluster and the like.

Referring now to FIG. 1, a network implementation 100 of a system 102 for assisting a user to resolve a hardware issue and s software issue is disclosed. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented over a cloud network. Further, it will be understood that the system 102 may be accessed by multiple users through one or more user devices 104-1, 104-2 ... 104-N, collectively referred to as user device 104 hereinafter, or applications residing on the user device 104. Examples of the user device 104 may include, but are not limited to, a portable computer, a personal digital assistant, a handheld device, and a workstation. The user device 104 may be communicatively coupled to the system 102 through a network 106.

In one implementation, the network 106 may be a wireless network, a wired network or a combination thereof. The network 106 may be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

In one embodiment, the system 102 may be configured to categorise a set of tickets, stored in a ticket repository. The set of tickets may be categorized to generate a set of clusters. Each ticket, from the set of tickets, may be associated with a ticket description. In one aspect, the set of tickets may be categorized based on a ticket description, associated with each ticket, from the set of tickets. Each cluster, from the set of clusters, may be configured to maintain one or more tickets, from the set of tickets. Each cluster may indicate an issue type of the one or more tickets. In one example, each ticket, from the set of tickets, may be associated with one of a hardware issue or a software issue.

Further, the system 102 may be configured to receive a new ticket from a user. In one embodiment, the new ticket may correspond to a target issue. The new ticket may be associated with a new ticket description. Once the new ticket is received, the system 102 may be configured to identify a target cluster, from the set of clusters, associated with the new ticket. In one embodiment, the system 102 may be configured to analyse a new ticket description, associated with the new ticket, to identify the target cluster. The new ticket description may be analysed using a Convolution Neural Network based neural language model.

Upon identification of the target cluster, the system 102 may be configured to analyse the new ticket description using an artificial intelligence based recommendation engine. Based on analysis of the new ticket description, the system 102 may be configured to recommend one or more runbook scripts, from the runbook repository. Further, a runbook script description may be associated with the one or more runbook scripts. In one embodiment, a set of runbook scripts may be stored in the runbook repository. In one aspect, the one or more runbook scripts may comprise a runbook name, a runbook tag, a runbook tag, category and the like.

Further, the system 102 may be configured to identify a new runbook script, associated with the new ticket, from a set of external repositories. In one aspect, the new runbook script may be identified, when the one or more runbook scripts are not available in the runbook repository or the one or more runbook scripts fail to resolve the target issue. The new runbook script may be identified based on a natural language processing and a text extraction algorithm. In one embodiment, the system 102 may extract information, associated with the new ticket, from the set of external repositories. Based on the extracted information, the system 102 may be configured to generate the new runbook script. In one embodiment, the new runbook script may be generated using reinforcement learning technique.

Furthermore, the system 102 may execute at least one of the one or more runbook scripts or the new runbook script. In one aspect, the one or more runbook script or the new runbook script may be executed to resolve the target issue. In one example, one of the one or more runbook scripts or the new runbook scripts may resolve the target issue. In another example, the one or more runbook script and the new runbook script may fail to resolve the target issue.

Upon execution of the runbook scripts, the system 102 may be configured to generate a document. In one embodiment, the document may comprise the new ticket, the new ticket description, the target cluster, the one or more runbook scripts, the new runbook script and the like. In one example, the user may refer the document to resolve the target issue in future. In the example, the document may comprise history of the target issue.

Figure 2:
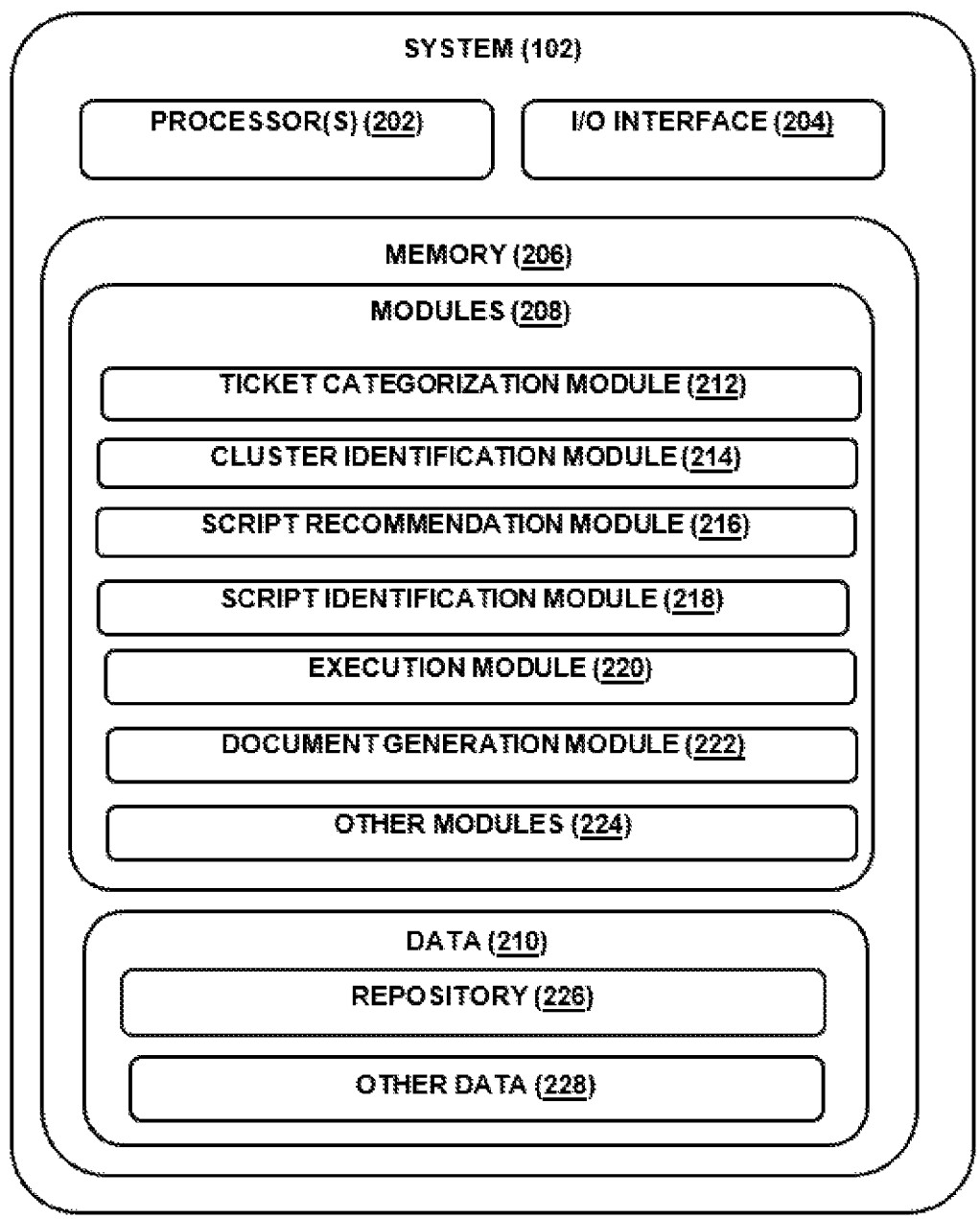
FIG. 2 illustrates the system for assisting a user to resolve a hardware issue and a software issue, in accordance with an embodiment of the present subject matter.

Referring now to FIG. 2, the system 102 for assisting a user to resolve a hardware issue and a software issue is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user device 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or nonvolatile memory, such as read only memory (ROM), erasable programmable ROM, flash memories, hard disks, optical disks, and magnetic tapes. The memory 206 may include modules 208 and data 210.

The modules 208 may include routines, programs, objects, components, data structures, and the like, which perform particular tasks, functions or implement particular abstract data types. In one implementation, the module 208 may include a ticket categorization module 212, a cluster identification module 214, a script recommendation module 216, a script identification module 218, an execution module 220, a document generation module 222, and other modules 224. The other modules 224 may include programs or coded instructions that supplement applications and functions of the system 102.

The data 210, amongst other things, serve as a repository for storing data processed, received, and generated by one or more of the modules 208. The data 210 may also include a repository 226, and other data 228. In one embodiment, the other data 228 may include data generated as a result of the execution of one or more modules in the other modules 224.

In one implementation, a user may access the system 102 via the I/O interface 204. The user may be registered using the I/O interface 204 in order to use the system 102. In one aspect, the user may access the I/O interface 204 of the system 102 for obtaining information, providing input information or configuring the system 102.

In one embodiment, the ticket categorization module 212 may be configured to categorise a set of tickets, stored in a ticket repository. The ticket categorization module 212 may be configured to generate a set of clusters based on the categorization of the set of tickets. Each ticket, from the set of tickets, may be associated with a ticket description. In one embodiment, the set of clusters may be generated based on analysis of the ticket description, associated with each ticket, from the set of tickets. Each cluster, from the set of clusters, may indicate an issue type. In one aspect, each ticket, from the set of tickets, may be associated with a hardware issue or a software issue. In one embodiment, each cluster, from the set of clusters, may be configured to maintain one or more tickets, from the set of tickets.

In one embodiment, the ticket categorization module 212 may be configured to generate a set of tokens. The set of tokens may be generated based on parsing the ticket description, associated with each ticket from the set of tickets. Once the set of tokens are generated, the ticket categorization module 212 may be configured to remove one or more stop words from the ticket description, associated with each ticket. In one aspect, the one or more stop words may be removed based on analysis of each token from the set of tokens. Upon removing the one or more stop words, the ticket categorization module 212 may extract one or more words from the ticket description. Further, the ticket categorization module 212 may lemmatize the one or more words, of the ticket description, associated with each ticket. Based on the lemmatization, the ticket categorization module 212 may be configured to categorize the set of tickets to generate the set of clusters.

In one exemplary embodiment, consider ticket descriptions "High CPU utilization server A with threshold value 80%" and "High load on server B have threshold value 90%". In this case, only one cluster may be generated for both of these ticket description. In one example, the cluster may correspond to "High CPU utilization".

Further, the cluster identification module 214 may be configured to receive a new ticket from the user. In one aspect, the new ticket may correspond to a target issue. The target issue may be an issue in IT infrastructure, an issue in software development cycle, an issue in software application and the like. The new ticket may be associated with a new ticket description. Once the new ticket is received, the cluster identification module 214 may be configured to analyse the new ticket description. In one embodiment, the new ticket description may be analysed using a Convolution Neural Network (CNN) based neural language model. Based on the analysis, the cluster identification module 214 may identify a target cluster, from the set of clusters, associated with the new ticket description.

In one embodiment, once the new ticket description, associated with the new ticket, is received, the cluster identification module 214 may generate one or more vectors, associated with each word, from the new ticket description.

Further, the cluster identification module 214 may concatenate the one or more vectors to generate a vector, associated with the new ticket description. Once the vector is generated, the cluster identification module 214 may extract one or more features from the new ticket description. In one aspect, the one or more features may be extracted based on identification of one or more phrases on the new ticket description. Further, the cluster identification module 214 may perform a max pooling information on the one or more features. Based on the max pooling operation, the cluster identification module 214 may generate a feature vector. Further, the feature vectors, associated with the one or more features, may be connected. The cluster identification module 214 may further use the one or more feature vectors to identify the target cluster associated with the new ticket. In one aspect, a reinforcement learning approach may be used to compute Q-value associated with the new ticket. The Q-value may be further used to identify the target cluster, associated with the new ticket.

Once the target cluster is identified, the script recommendation module 216 may be configured to analyse the new ticket description. Based on the analysis the new ticket description, the script recommendation module 216 may recommend one or more runbook scripts, from a runbook repository. In one aspect, the new ticket description may be analysed using an artificial intelligence based recommendation engine. In one embodiment, the one or more runbook scripts may be associated with a runbook script description. In one aspect, the one or more runbook scripts may comprise a runbook name, a runbook tag, a runbook description, category and the like.

In one embodiment, each ticket, from the set of tickets, may be mapped with a set of runbook scripts, stored in the runbook repository. In the embodiment, the Convolution Neural Network (CNN) based neural language model may be used to map the ticket with the set of runbook scripts.

In one aspect, a probability, of the set of runbook scripts, to resolve an issue, may be stored in the runbook script. In one embodiment, each runbook script, from the set of runbook scripts, may be in different programming language such as C, C++, Java and the like. Further, the probability of the runbook script may be compared with a pre-defined threshold probability. Based on the comparison, the one or more runbook scripts, associated with the target issue, may be recommended. In one aspect, the probability of the one or more runbook script may higher than the pre-defined threshold probability.

In one embodiment, the artificial intelligence based recommendation engine may be configured to use a natural language processing to analyse the new ticket description. In one aspect, the script recommendation module 216 may be configured to use a natural language processing to analyse the new ticket description. Based on the analysis, the script recommendation module 216 may generate a vector, associated with each word/phrase in the new ticket description. Further, the script recommendation module 216 may generate an embedding vector, associated with the new ticket description. The embedding vector may be generated based on concatenation the vector, associated with each word/phrase of the new ticket description. The script recommendation module 216 may further analyse the embedding vector using a Convolution Neural Network (CNN) based neural language model. Based on the analysis, the one or more runbook scripts may be recommended.

In one aspect, the script recommendation module 216 may be configured to extract the runbook script description, associated with the one or more runbook scripts. Further, the script recommendation module 216 may convert the runbook script description into a condensed vector. In one aspect, the condensed vector may be generated using a deep auto encoder. Further, the new ticket description may be compared with the runbook script description, associated with the one or more runbook scripts. Based on the comparison, the script recommendation module 216 may prioritise the one or more runbook scripts. In one aspect, a list of the one or more runbook scripts may be generated. In the aspect, the runbook script, with highest priority, may be at the top of the list, and the runbook script, with least priority, may be at the bottom of the list.

Further, the script identification module 218 may be configured to identify at least one new runbook script, from a set of external repositories. In one aspect, the new runbook script may be identified using a natural language processing and a text extraction algorithm. In one embodiment, the new runbook script may be identified, when the one or more runbook scripts are not available in the runbook repository or the one or more runbook scripts fail to resolve the target issue.

In one embodiment, the script identification module 218 may be configured to extract information from the set of external repositories. Further, the script identification module 218 may generate the new runbook script, associated with the new ticket. In one aspect, the new runbook script may be generated based on analysis of the information extracted from the set of external repositories. The information may be extracted using natural language processing.

In another embodiment, the script identification module 218 may be configured to generate the new runbook script using a reinforcement learning. In one aspect, a runbook script, from the one or more runbook scripts, may be identified. The runbook script may correspond to a script with highest priority. Further, the runbook script may be executed. Upon execution of the runbook script, an error in one or more lines of the runbook script may be identified. In other words, the runbook script may be executed until the error is identified. Once the error is identified, an instruction may be generated for one of changing the one or more lines in the runbook script or deleting the one or more lines from the runbook script. In one aspect, the one or more lines, from the runbook script, may be replaced or the one or more lines, from the runbook script, may be deleted. Based on the execution of the instruction, the new runbook script may be generated. In one embodiment, the new runbook script may be stored in the runbook script, associated with the new ticket.

Further, the execution module 220 may be configured to execute one of the one or more runbook scripts, associated with the new ticket, or the new runbook script, associated with the new ticket. In one aspect, the one or more runbook scripts or the runbook script may be executed to resolve the target issue. In one example, the one or more runbook scripts and the new runbook script may resolve the target issue. In another example, the one or more runbook scripts or the new runbook script may fail to resolve the target issue.

Upon execution of the runbook scripts, the document generation module 222 may be configured to generate a document. The document may comprise the new ticket, the new ticket description, the target cluster, the one or more runbook scripts, the runbook script description, the new runbook script, the new runbook script description, and the like. In one embodiment, the document may be generated based on the execution of the one or more runbook scripts or the new runbook script. In one example, the user may refer the document in order to resolve the target issue in future. In the example, if the one or more runbook scripts or the new runbook script fails to resolve the target issue, then the user may refer the document to check the runbook scripts used to resolve the target issue.

In one embodiment, a set of documents, associated with the set of tickets, may be stored in a document repository. In the embodiment, the document, associated with the target issue, may be stored in the document repository. In the aspect, one or more documents, associated with the target issue, may be available in the document repository. In one aspect, the user may provide rating to each document, associated with the target issue, stored in the document repository. In the aspect, the rating of the document may indicate the relevancy of the document. In one example, the user may provide the rating from scale of 1 to 5. In the example, the rating 1 may indicate the most relevant document and rating 5 may indicate least relevant document.

Exemplary embodiments discussed above may provide certain advantages. Though not required to practice aspects of the disclosure, these advantages may include those provided by the following features.

Some embodiments of the system and the method is configured to generate a runbook script to resolve an issue.

Some embodiments of the system and the method is configured to generate a document that a user can refer anytime in future.

Figure 3:
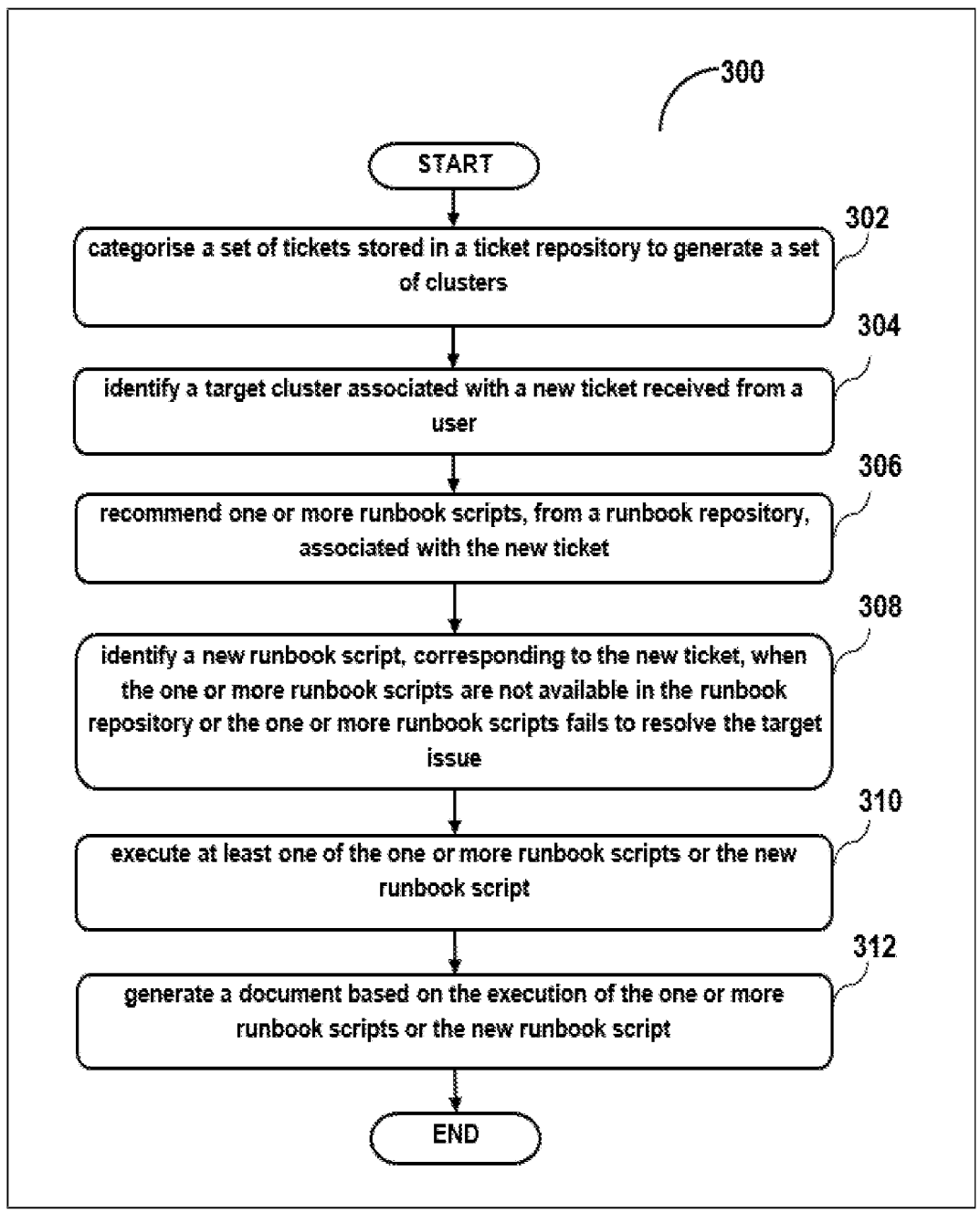
FIG. 3 illustrates a method for assisting a user to resolve a hardware issue and a software issue, in accordance with an embodiment of the present subject matter.

Referring now to FIG. 3, a method 300 for assisting a user to resolve a hardware issue and a software issue, is disclosed in accordance with an embodiment of the present subject matter. The method 300 may be described in the general context of computer executable instructions. Generally, computer executable instructions can include routines, programs, objects, components, data structures, procedures, modules, functions, and the like, that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method 300 can be implemented in any suitable hardware, software, firmware, or combination thereof. However, for ease of explanation, in the embodiments described below, the method 300 may be considered to be implemented in the above described system 102.

At block 302, a set of tickets, stored in a ticket repository, may be categorised. In one implementation, the ticket categorization module 212 may categorise the set of tickets. Based on the categorization of the set of tickets, a set of clusters may be generated. In one aspect, each cluster, from the set of clusters, may be configured to maintain one or more tickets, from the set of tickets. Each cluster may indicate an issue type. Each ticket, from the set of tickets, may be associated with a ticket description. In one embodiment, the set of tickets may be categorised based on the ticket description.

At block 304, a new ticket may be received from a user. Further, a target cluster, associated with the new ticket, may be identified. In one implementation, the cluster identification module 214 may identify the target cluster, associated with the new ticket. The target cluster, from the set of clusters, may be identified based on analysis of a new ticket description, associated with the new ticket. The new ticket description may be analysed using a Convolution Neural Network based neural language models. In one aspect, the new ticket may correspond to a target issue.

At block 306, one or more runbook scripts, associated with the new ticket, may be recommended. In one implementation, the script recommendation module 216 may recommend the one or more runbook scripts, from a runbook repository. The one or more runbook scripts may be recommended based on analysis of the new ticket description. The new ticket description may be analysed using an artificial intelligence based recommendation engine.

At block 308, a new runbook script may be identified. In one implementation, the script identification module 218 may identify the new runbook script based on analysis of a set of external repositories. In one aspect, the new runbook script may be identified using a natural language processing and a text extraction algorithm. In the aspect, the new runbook script may be identified, when the one or more runbook scripts are not available in the runbook repository or the one or more runbook scripts fails to resolve the target issue.

At block 310, one of the one or more runbook scripts, associated with the new ticket, or the new runbook script, associated with the new ticket, may be executed. In one implementation, the execution module 220 may execute one of the one or more runbook scripts or the new runbook script.

At block 312, a document, associated with the new ticket, may be generated. In one implementation, the document generation module 222 may generate the document based on the execution of the one or more runbook scripts or the new runbook script.

Although implementations for systems and methods for assisting a user to resolve a hardware issue and a software issue have been described, it is to be understood that the appended claims are not necessarily limited to the specific features or methods described. Rather, the specific features and methods are disclosed as examples of implementations for assisting the user to resolve the hardware issue and the software issue.

We claim:

1. A system for assisting a user to resolve a hardware issue and a software issue, the system comprising:
   a memory;
   a processor coupled to the memory, wherein the processor is configured to execute programmed instructions stored in the memory to:
   categorise a set of tickets stored in a ticket repository to generate a set of clusters, wherein each cluster, from the set of clusters, is configured to maintain one or more tickets from the set of tickets, wherein each ticket is associated with a ticket description, and wherein the categorization is based on the ticket description;
   identify a target cluster, from the set of clusters, associated with a new ticket received from a user, wherein a new ticket description, associated with the new ticket, is analysed using a Convolution Neural Network based neural language model for identifying the target cluster, and wherein the new ticket corresponds to a target issue;
   recommend one or more runbook scripts, from a runbook repository, associated with the new ticket based on analysis of the new ticket description using an artificial intelligence based recommendation engine, wherein the one or more runbook scripts are associated with a runbook script description, and wherein the one or more runbook scripts comprise a probability, to resolve the new ticket, higher than a pre-defined threshold probability;
   identify a new runbook script, corresponding to the new ticket, from a set of external repositories using a natural language processing and a text extraction algorithm, when the one or more runbook scripts are not available in the runbook repository or the one or more runbook scripts fail to resolve the target issue;
   execute at least one of the one or more runbook scripts or the new runbook script associated with the new ticket; and
   generate a document based on the execution of the one or more runbook scripts or the new runbook script, thereby assisting the user to resolve the target issue.

2. The system of claim 1, further configured to generate the new runbook script, corresponding to the new ticket, using a natural language processing and a reinforcement learning, wherein the new runbook script is generated based on analysis of information extracted from the set of external repositories.

3. The system of claim 1, wherein each ticket from the set of tickets is associated with one of a hardware issue or a software issue.

4. The system of claim 1, wherein the document comprises the new ticket, the new ticket description, the target cluster, the one or more runbook scripts, and the new runbook script.

5. The system of claim 1, further configured to store the new runbook script, associated with the new ticket, in the runbook repository.

6. The system of claim 1, further configured to process the ticket description associated with each ticket based on:
   parsing the ticket description, corresponding to each ticket from the set of tickets, to generate a set of tokens;
   removing one or more stop words from the ticket description of each ticket based on analysis of the set of tokens;
   extracting one or more words from the ticket description of each ticket based on the removal of one or more stop words; and
   lemmatizing the one or more words of the ticket description associated with each ticket, wherein each ticket from the set of ticket is categorised based on the lemmatization.

7. The system of claim 1, further configured to compute a Q-value for a new ticket, wherein the Q-value is used to identify the target cluster associated with the new ticket.

8. The system of claim 1, further configured to map a set of runbook scripts, stored in the runbook repository, to the set of tickets using a Convolution Neural Network based neural language model.

9. The system of claim 1, wherein the one or more runbook scripts comprises a runbook name, a runbook tag, a runbook description, and category.

10. The system of claim 1, further configured to prioritise the one or more runbook scripts based on:
    extracting the runbook script description associated with the one or more runbook scripts from the runbook repository;

converting the runbook script description into a condensed vector using deep auto encoders;
computing a similarity between the new ticket description and the runbook script description;
prioritising the one or more runbook scripts based on the similarity between the new ticket description and the runbook script description, wherein the similarity between the new ticket description and the runbook script description is computed using a neural language model.

11. The system of claim 1, wherein the target cluster is identified based on the analysis of the new ticket description based on:
generating a vector for the new ticket description associated with the new ticket based on concatenating one or more vectors associated with each word from the new ticket description;
extracting one or more features from the new ticket description based on identification of one or more phrases on the new ticket description;
generating a feature vector based on execution of a max pooling operation on the one or more features; and
connecting the feature vectors associated with the one or more features, wherein the feature vectors are used to identify the target cluster.

12. A method for assisting a user to resolve a hardware issue and a software issue, the method comprising steps of:
categorising, by a processor, a set of tickets stored in a ticket repository to generate a set of clusters, wherein each cluster, from the set of clusters, is configured to maintain one or more tickets from the set of tickets, wherein each ticket is associated with a ticket description, and wherein the categorization is based on the ticket description;
identifying, by the processor, a target cluster, from the set of clusters, associated with a new ticket received from a user, wherein a new ticket description, associated with the new ticket, is analysed using a Convolution Neural Network based neural language model for identifying the target cluster, and wherein the new ticket corresponds to a target issue;
recommending, by the processor, one or more runbook scripts, from a runbook repository, associated with the new ticket based on analysis of the new ticket description using an artificial intelligence based recommendation engine, wherein the one or more runbook scripts are associated with a runbook script description, and wherein the one or more runbook scripts comprise a probability, to resolve the new ticket, higher than a pre-defined threshold probability;
identifying, by the processor, a new runbook script, corresponding to the new ticket, from a set of external repositories using a natural language processing and a text extraction algorithm, when the one or more runbook scripts are not available in the runbook repository or the one or more runbook scripts fail to resolve the target issue;
executing, by the processor, at least one of the one or more runbook scripts or the new runbook script associated with the new ticket; and
generating, by the processor, a document based on the execution of the one or more runbook scripts or the new runbook script, thereby assisting the user to resolve the target issue.

13. The method of claim 12, further comprises generation of the new runbook script, corresponding to the new ticket, using a natural language processing and a reinforcement learning, wherein the new runbook script is generated based on analysis of information extracted from the set of external repositories.

14. The method of claim 12, wherein each ticket from the set of tickets is associated with one of a hardware issue or a software issue.

15. The method of claim 12, wherein the document comprises the new ticket, the new ticket description, the target cluster, the one or more runbook scripts, and the new runbook script.

16. The method of claim 12, further comprises storing the new runbook script, associated with the new ticket, in the runbook repository.

17. The method of claim 12, further comprises processing the ticket description associated with each ticket based on:
parsing the ticket description, corresponding to each ticket from the set of tickets, to generate a set of tokens;
removing one or more stop words from the ticket description of each ticket based on analysis of the set of tokens;
extracting one or more words from the ticket description of each ticket based on the removal of one or more stop words; and
lemmatizing the one or more words of the ticket description associated with each ticket, wherein each ticket from the set of ticket is categorised based on the lemmatization.

18. The method of claim 12, further comprises computing a Q-value for a new ticket, wherein the Q-value is used to identify the target cluster associated with the new ticket.

19. The method of claim 12, further comprises mapping a set of runbook scripts, stored in the runbook repository, to the set of tickets using a Convolution Neural Network based neural language model.

20. The method of claim 12, wherein the one or more runbook scripts comprises a runbook name, a runbook tag, a runbook description, and category.

21. The method of claim 12, further comprises prioritising the one or more runbook scripts based on:
extracting the runbook script description associated with the one or more runbook scripts from the runbook repository;
converting the runbook script description into a condensed vector using deep auto encoders;
computing a similarity between the new ticket description and the runbook script description;
prioritising the one or more runbook scripts based on the similarity between the new ticket description and the runbook script description, wherein the similarity between the new ticket description and the runbook script description is computed using a neural language model.

22. The method of claim 12, wherein the target cluster is identified based on the analysis of the new ticket description based on:
generating a vector for the new ticket description associated with the new ticket based on concatenating one or more vectors associated with each word from the new ticket description;
extracting one or more features from the new ticket description based on identification of one or more phrases on the new ticket description;
generating a feature vector based on execution of a max pooling operation on the one or more features; and
connecting the feature vectors associated with the one or more features, wherein the feature vectors are used to identify the target cluster.

23. A computer readable medium having embodied thereon a computer program for assisting a user to resolve a hardware issue and a software issue, the computer program product comprises:
- a program code for categorising a set of tickets stored in a ticket repository to generate a set of clusters, wherein each cluster, from the set of clusters, is configured to maintain one or more tickets from the set of tickets, wherein each ticket is associated with a ticket description, and wherein the categorization is based on the ticket description;
- a program code for identifying a target cluster, from the set of clusters, associated with a new ticket received from a user, wherein a new ticket description, associated with the new ticket, is analysed using a Convolution Neural Network based neural language model for identifying the target cluster, and wherein the new ticket corresponds to a target issue;
- a program code for recommending one or more runbook scripts, from a runbook repository, associated with the new ticket based on analysis of the new ticket description using an artificial intelligence based recommendation engine, wherein the one or more runbook scripts are associated with a runbook script description, and wherein the one or more runbook scripts comprise a probability, to resolve the new ticket, higher than a pre-defined threshold probability;
- a program code for identifying a new runbook script, corresponding to the new ticket, from a set of external repositories using a natural language processing and a text extraction algorithm, when the one or more runbook scripts are not available in the runbook repository or the one or more runbook scripts fail to resolve the target issue;
- a program code for executing at least one of the one or more runbook scripts or the new runbook script associated with the new ticket; and
- a program code for generating a document based on the execution of the one or more runbook scripts or the new runbook script, thereby assisting the user to resolve the target issue.

* * * * *